Feb. 11, 1969

CONDITIONING POWDER FOR DRYCLEANING SOLVENT

Filed March 18, 1965

3,427,249
CONDITIONING POWDER FOR
DRYCLEANING SOLVENT
Raymond George Riede, Martinsville, and Clifford William Cain, Jr., Bound Brook, N.J., assignors to Johns-Manville Corporation, New York, N.Y., a corporation of New York
Filed Mar. 18, 1965, Ser. No. 440,686
U.S. Cl. 252—163
Int. Cl. B08b *3/08;* B01d *15/00;* B01j *1/22*
9 Claims

ABSTRACT OF THE DISCLOSURE

The removal of fatty acid soil from an organic drycleaning solvent is improved by using as a sweetener hydrothermal calcium silicate having a lime to silica ratio of about 1.5 to 2.0:1. A combination of about 5–15% by weight of calcium silicate and about 85–95% by weight of filter aid is mixed with the drycleaning solvent, and fatty acid soil is removed from the system by filtering.

This invention relates to improvements in sweetening agents for drycleaners' solvents and to an improved sweetener composition containing particulate hydrated calcium silicate that is suitable for the removal and control of free fatty acid in substantially all types of commercial drycleaning solvents. More particularly, the present invention relates to an improved sweetener composition, which is both more efficient in removing and controlling fatty acid and which permits lower filter pressure in the removal of the sweetener from a solvent system than presently known sweeteners of the same and/or different types.

In commercial drycleaning, organic solvents are utilized to remove certain soils from garments, fabrics, etc. A quantity of soap or detergent, either emulsified or dissolved in the solvent, may also be employed to remove other types of soil that may be present. Because of good stability and relatively high cost, the solvents are reused and continuously recycled in the drycleaning process, and it is desirable to recondition the solvent and remove entrained soils therefrom, in order to provide clean solvent for the cleaning of successive batches of soiled garments.

The soils removed from the garments and the like and imparted to the solvent are of two general types, i.e., soluble and insoluble. The accumulated insoluble soils such as dirt particles, lint, and other particulate matter, are removed from the solvent by mechanical entrapment in a filter. The soluble soils such as color bodies, fatty acids, and other non-volatiles are more difficult to remove or control, however.

For example, a typical drycleaning technique will include dissolving and/or removing fatty acids with an organic solvent such as a petroleum solvent, perchlorethylene, and carbon tetrachloride, containing soap or detergents. Excessive fatty acid concentration or content in drycleaning media can result in undesirable odors, cause objectionable streaks and swales in garments being cleaned and increase drying time. Hence, the fatty acids must be effectively controlled or removed before they build up, through recycliing and reuse of the solvent, to an undesirable limit. Of course all soluble soils, including fatty acids, may be completely removed from the solvent by distillation, but this means of purifying the solvent in addition to being time-consuming, removes costly detergent. Because of the high cost of typical drycleaning detergents, as well as the cost of purchasing and running reliable distillation equipment, most drycleaners find it uneconomical or otherwise undesirable to regularly distill.

Such complete removal procedure of free fatty acid is also undesirable since it is the general opinion of the drycleaning industry that the best cleaning is not accomplished when the solvent is completely devoid of fatty acids. Most cleaners prefer to work with a moderate build-up of fatty acid, but safely below the generally accepted maximum allowable figure of 0.3 acid number.

Accordingly, various drycleaners' solvent sweeteners have been proposed and/or utilized in lieu of distillation. These sweeteners may be defined or described as materials which have the ability or capacity to remove or control soluble soils such as fatty acids from organic solvents by adsorption, saponification, or other chemical reaction. Typical sweeteners are categorized into two types: one type comprises adsorbent materials such as activated carbon and activated clays which are highly effective in adsorbing soluble dyes but substantially ineffective in removing or controlling fatty acids, and the second type comprises alkali chemicals and magnesium silicates which neutralize or saponify fatty acids but are not adequate for controlling color, which is permitted to build up to excessive amounts can cause damaging colorizing of fabrics.

Products comprising synthetic magnesium silicates achieved extensive application in the removal or control of fatty acids in drycleaners' solvents during the period when the typical procedure comprised the addition of fresh soap or detergent to each batch system of drycleaning followed by filtering out the soap or detergent with the accumulated soil upon completion of each batch. However, with the advent of the now almost universally adopted detergent charge system, this type of sweetener has proved undesirable because of excessive detergent removal from the solvent. Moreover, the use of magnesium silicate type sweeteners often resulted in relatively high and undesirable filter pressures as well as not exhibiting entirely satisfactory or optimum acid removal or control properties. The detergent charge system, of course, consists of initially adding a charge of detergent which dissolves in the solvent and is not removed at the filter, hence maintaining the same charge throughout a series of washes or runs and filtering out only the soil upon completion of each batch from the filterable solvent and detergent solution.

To date, one of the most effective methods of removing the objectionable fatty acids in drycleaning solvents has been through the use, as a sweetener, of the hydrated calcium silicate described in U.S. Letters Patent No. 3,099,626, dated July 30, 1963, to R. G. Riede. According to the invention of such patent, fatty acid control is achieved by utilizing a synthetic hydrated calcium silicate as a reactant sweetener for fatty acids soil in drycleaners' solvents. Such hydrated calcium silicates effectively reduce or control fatty acids concentrations (acid number) by maintaining an approximately constant acid concentration or level without exhibiting uneconomical or undesirable side effects such as detergent adsorption and high filter pressures. Such particulate hydrated calcium silicate materials simply need be added or admixed with the acid soil contaminated drycleaners' solvent by dispersing the particulate material throughout the solvent at substantially any point or stage of a typical drycleaning system.

The hydrated calcium silicates according to Patent No. 3,099,626 are prepared by hydrothermal reaction of lime and a siliceous material such as diatomaceous silica. The hydrated calcium silicate composition may be calcium silicate hydrate I, a compound which comprises one hydrothermally prepared from lime and a siliceous material such as diatomaceous silica in a $CaO/SiO_2$ mol ratio of about 0.5 to 0.6. Other calcium silicate compositions such as xonotlite and the hydrated calcium silicate composition described in United States Patent No. 2,966,441, will likewise suffice according to Patent No. 3,099,626.

As supplied by the manufacturer, the sweetener of the Patent No. 3,099,626 is both an effective and trouble-free drycleaning sweetener when used in accordance with the manufacturer's instructions. When these instructions are not followed, however, and this is all too frequently the case, high filter pressures can develop, thereby reducing filtration cycle length. Unfortunately, many drycleaners have discontinued the use of such sweetener because of pressure problems admittedly caused through error or inadvertence.

It is also disclosed in Patent No. 3,099,626, that to increase the porosity of the cake which accumulates upon the filter, it is desirable to incorporate with these calcium silicates an efficient filter aid medium. These filter aid media may comprise substantially any typical filter aid such as diatomaceous silica, perlite, cellulosic or carbonaceous materials, etc., provided it is compatible with the balance of the system and does not adsorb desirable components from the same. Diatomaceous silica is usually the preferred filter aid medium. While it is stated that these filter aids may comprise up to about 75% by weight of the mixture or combination of hydrated calcium silicate and filter aid medium, in practice, mechanical admixtures or combinations comprising only about 30% of a filter aid medium and about 70% of a hydrothermally prepared hydrated calcium silicate can be employed, or at most, approximately equal parts by weight of filter aid and hydrated calcium silicate when the latter is prepared by precipitation rather than hydrothermal reaction, although this is undesirable, due to the relative inefficiency of such calcium silicates. This leads, in turn, to still greater pressure problems with the sweetener of Patent No. 3,099,626. On the other hand, if the amount of filter aid is increased in an attempt to alleviate the pressure problem, then the fatty acid content will increase.

Accordingly, the art is still desirous of a substantially trouble free sweetened or reconditioning agent for drycleaners' solvents that will, substantially without fail, provide for lower filter pressures, and desirably also be more effective in the control and removal of fatty acid, than the sweetener of Patent No. 3,099,626.

It is therefore a primary object of this invention to provide an improved and compatible drycleaners' solvent sweetener which is capable of controlling or maintaining a substantially uniform or constant fatty acids content (acid number) in typical drycleaners' solvents throughout a substantial number of cycles or loads.

It is another object of this invention to provide an efficient and effective reactant for fatty acids which does not remove excessive amounts of soap or detergent from the system and does not impart high filter pressures.

It is a further object of this invention to provide an improved calcium silicate sweetener for drycleaner's solvent which effectively stabilizes the fatty acids content (acid number) of drycleaners' solvents substantially without increasing filter pressure or uneconomically removing soap or detergent from the system.

It is a still further object of this invention to provide an improved sweetener for drycleaners' solvents which preferentially adsorbs the fatty acids soil content when utilized in a system containing a high acid soap or detergent and which retains the adsorbed acids thereby inhibiting a build-up of either fatty acids and/or acid neutralization products, i.e., the non-volatile content of the cleaning solvent.

It is still another object of this invention to provide an improved sweetener for drycleaners' solvents, in the form of a conditioning powder, which is more efficient in removing and controlling fatty acids content, causes lower filter pressures and is a better improvement in the rectification of drycleaning solvents than the sweetener composition of Patent No. 3,099,626.

This invention will be more fully understood and further objects and advantages thereof will become apparent from the hereinafter detailed description and the drawings in which.

Figure 5:
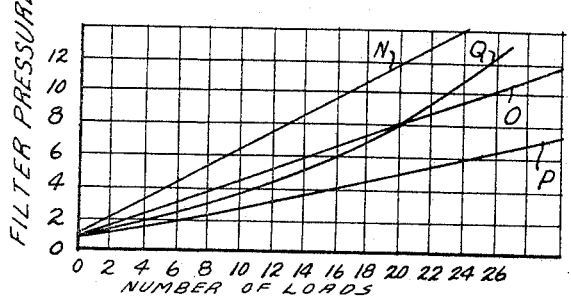
Figure 6:
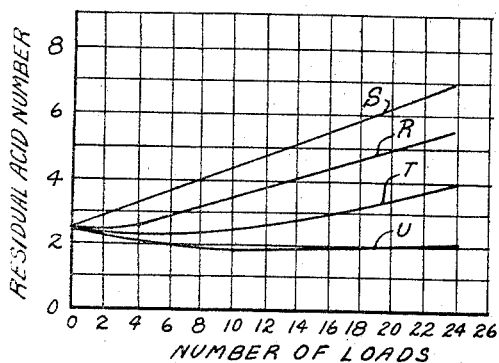

FIG. 5 is a graph showing the relative filter pressure characteristic resulting from various preferred compositions according to the invention, compared with a filter aid, and compared with the sweetener composition of Patent No. 3,099,626; and FIG. 6 is a group showing the relative fatty acids content (acid number) resulting from the same preferred compositions according to the invention, compared with the same filter aid, and compared with the sweetener composition of Patent No. 3,099,626.

According to the present invention, the foregoing as well as other objects and advantages are achieved by utilizing an improved hydrated calcium silicate of synthetic origin as a sweetener and/or reactant for fatty acids soil in drycleaners' solvents. The hydrated calcium silicates of this invention effectively reduce or control fatty acids concentrations (acid number) by maintaining an approximately constant acid concentration or level without exhibiting uneconomical or undesirable side effects such as detergent adsorption and high filter pressures, among other possible disadvantages, and they are simple to administer or utilize. For example, the particulate hydrated calcium silicate materials of this invention, preferably in combination with a filter aid according to the invention, simply need be added or admixed with the acid soil contaminated drycleaners' solvent by dispersing the particulate material throughout the solvent at substantially any point or stage of a typical drycleaning system.

The preferred hydrated calcium silicates for the practice of this invention are prepared by hydrothermal reaction of lime and a siliceous material such as diatomaceous silica. As with the hydrated calcium silicate of Patent No. 3,099,626, it is also preferred that the hydrated calcium silicate comprise the calcium silicate composition identified in the art as calcium silicate hydrate I, a compound of variable composition described in detail by Taylor, Journal of the Chemical Society No. 1950, page 3682. A method of making this material is described in United States Letters Patent No. 1,574,363 to Calvert.

While the sweetener of Patent No. 3,099,626, comprises a calcium silicate prepared from lime and silica in a ratio of about 0.5 or 0.6, according to the present invention however, it has been discovered that increased fatty acid removal efficiency can be obtained by increasing the mol ratio of lime to silica in the synthesis of the hydrated calcium silicate. More particularly, it has been found according to the present invention that increased fatty acid removal efficiency of a calcium silicate can be obtained by increasing the mol ratio of the lime to silica to about 1.5–2 in the synthesis reaction. Specifically, in this invention there is employed a calcium silicate that has been prepared by hydrothermally reacting hydrated lime and diatomaceous silica at 350 to 360° F. for two hours.

Thus, as compared to Patent No. 3,099,626 wherein the calcium silicate used was made at a lime (CaO) to silica ($SiO_2$) ratio of 0.5, the substance of the present invention is the discovery that the fatty acid removal efficiency of the calcium silicate increases as the lime to silica ratio increases. Ratios up to and above 2 have been tried and found to be effective, but a CaO to $SiO_2$ ratio of between about 1.5 and 2.0 is preferred. Because of the much higher fatty acid removal efficiency of the higher ratio calcium silicate, less silicate and hence, more filter acid can be used in the prepared mixture, thus causing lower filter pressure.

That is, in order to increase the porosity of the cake which accumulates upon the filter, among other advantages, it is also desirable and preferred, according to the present invention, to incorporate with said calcium silicates an efficient filter aid medium. These filter aid media may comprise substantially any typical filter aid such as diatomaceous silica, perlite, cellulosic or carbonaceous materials, etc., provided it is compatible with the balance of the system and does not adsorb desirable components from the same. Diatomaceous silica is the preferred filter aid medium, and in contrast to Patent No. 3,099,626, it is desirable and preferred according to the present invention that filter aids may comprise up to about 95% by weight of the mixture or combination of hydrate calcium silicate and filter aid medium. Normally, mechanical admixtures or combinations comprising above about 30 or 40% of the filter aid medium, and desirable above about 70 or 80% of the filter aid medium are employed, with the remainder being the improved calcium silicate according to the present invention. As will be appreciated from subsequent examples and ensuing discussion of the drawings, the high lime calcium silicate of the present invention permits the employments of these hereto unexpectedly high diatomaceous silica percentages, offering in turn, surprising improvements in filter pressure characteristics with the present inventive composition.

The amount of hydrated calcium silicates required to sweeten a given drycleaners' solvent depends, not only upon the capacity of the present improved calcium silicate composition, but also upon the acid content of the solvent (which in turn depends upon the weight or amount of clothes cleaned per unit of solvent and their soil condition) and, among other potentially influencing factors, the degree or extent of acid removal desired. For purposes of illustration rather than limitation, typical proportions for most normal systems may consist of about 1 pound of sweetener per 1000 gallons per hour filter capacity when added after precoating or about ¼ to ½ pound per 100 pounds of soiled clothes when added with the clothes. Typically, however, varying conditions and systems necessitate experimentation to determine proportions for desired or optimum results. Moreover, and as already noted, many drycleaners prefer to work with a moderate fatty acids concentration, for example, an acid number of about 0.2 or a maximum allowable number of 0.3, and it therefore may be desirable or necessary that the sweetener does not remove all of the acids present but maintains a constant concentration and prevents a build-up from exceeding a predetermined acid number. For these reasons, and because the acid build-up depends, among other factors, on the soil content of the clothes as well as the weight and/or amount of the same and number of runs or batches, it is not practical or feasible to arbitrarily delineate appropriate amounts of hydrated calcium silicate to effect solvent sweetening. In other words, many conditions or variables must be taken into consideration before it is possible to ascertain the proper proportions or quantities of hydrated calcium silicate to be utilized and even then it may take several test runs to achieve a desirable to a maximum level of operation.

The following examples are offered to illustrate preferred methods of preparation of the improved calcium silicate according to the present invention, and to illustrate the relative characteristics of the improved drycleaners' solvent sweetener of the present invention in comparison with the sweetener of U.S. Patent No. 3,099,626. It is to be understood that the specified operating conditions, techniques or the like are exemplary and are not to be construed to limit the invention to the particular components, proportions or other conditions specified in the hereinafter described examples.

Example 1

A medium high lime calcium silicate was prepared, holding the $CaO/SiO_2$ ratio at 0.8, and solids loading was 0.5 lb./gal. A turbine agitator was operated at a very high rate (850 r.p.m. as against 610 r.p.m. normal operation), and reaction was initiated at 390° F. for one-half hour followed by reaction at 450° F. for two hours. The reactor was then depressurized and discharged at low pressure (50 p.s.i.g.). The slurry was then filtered and dried giving a very hard, tough cake. The dry cake was crushed on a jaw crusher and screened to give a 6/20 mesh fraction. 52.9% of the cake was in the 6/20 mesh screen fraction while 47.1% was −20 mesh, designated as Sample No. 1. The −20 mesh fraction was further milled to give a fine powder, designated as Sample No. 1A.

Example 2

The procedure of Example 1 was essentially repeated, except that the $CaO/SiO_2$ ratio was held at 1.5 for this reaction while solids loading was 0.5 lb./gal. Agitation was normal and reaction was carried out at 350° F. for two hours. The slurry was discharged normally (through a throttling valve), and filtered. Half of the wet cake was dried, and granulated as described before to give 65.5 percent 6/20 mesh granules, designated as Sample No. 2, and 34.5% fines. The fines were hammer-milled to a fine powder, designated as Sample No. 2A. The remaining half of the wet cake was subjected to high shear agitation for one-half hour in a 1½ inch diameter propeller agitator at 7500 r.p.m. The sheared cake was dewatered, dried, and granulated to give 67.4 percent 6/20 mesh granules, designated as Sample No. 2B, and 32.6% fines, designated as Sample No. 2C.

Example 3

The procedure of Example 1 was essentially repeated again, but this time holding the $CaO/SiO_2$ ratio at 2.0 for this reaction. The solid loading was 0.5 lb./gal., and agitation was normal. The reaction was carried out at 350° F. for two hours. The slurry was discharged normally, filtered, dried and granulated. 55.6% of the product was in the 6/20 mesh range, designated as Sample No. 3, and 44.4% was fines, designated as Sample No. 3A. The fines were milled to a fine powder using the Mikro sample mill, and designated as Sample No. 3B.

The properties of representative samples are summarized in Table 1 which relates to the test work done on the granular samples. In this case rather than add one gram to each load as is done with sweetening powder, a ten gram charge was placed in a column or tower in the solvent filtrate stream of a typical dry cleaning plant. From a study (see discussion of FIGURES 1 and 2 below) of the relative fatty acid removal capacities, it appears that optimum fatty acid removal occurs at a $CaO/SiO_2$ ratio of 1.5. Table 1 shows that the overall fatty acid removal capacity over a 20 load run for this product is 0.68 ml. as oleic per gram of high lime calcium silicate granules. This is three times the amount removed by the granular product of Patent No. 3,099,626.

TABLE 1.—DRYCLEANING DATA ON EVALUATION OF EXPERIMENTAL CALCIUM SILICATE GRANULES

| Sample No. | 0[1] | 1 | 2B | 3 |
|---|---|---|---|---|
| CaO/SiO$_2$ Ratio | 0.5 | 0.8 | 1.5 | 2.0 |
| Filter Pressure in p.s.i. after 20 loads | 1.15 | 1.23 | 1.15 | 1.29 |
| Acid No.: | | | | |
| Initial | .237 | .237 | .237 | .237 |
| After 20 loads | .598 | .560 | .268 | .263 |
| Fatty Acid Removal in ml. oleic/g. CaO/SiO$_2$ sweetener | 0.23 | 0.28 | 0.68 | 0.69 |
| Solvent Color (Optical Density): | | | | |
| Initial | .029 | .027 | .029 | .029 |
| After 20 loads | .405 | .408 | .400 | .430 |
| Detergent Removal in percent after 20 loads | 14 | 13.3 | 15 | 16.5 |

[1] Sweetener of U.S. Patent No. 3,099,626.

TABLE 2.—DRYCLEANING DATA ON EVALUATION OF HIGH LIME CONTENT CALCIUM SILICATE

| Sample No. | 2A | 2A | 2A | 0[1] | 2A |
|---|---|---|---|---|---|
| Composition | 15% 2A, 85% DA$_2$.[2] | 30% 2A, 70% DA$_2$.[2] | 60% 2A, 40% DA$_2$.[2] | 60% 0, 40% DA$_2$.[2] | 15% 2A, 85% DA$_1$.[3] |
| Filter Pressure in p.s.i. after 20 loads. | 1.4 | 2.9 | 8.5 | 1.7 | 1.8. |
| Acid Number: | | | | | |
| Initial | .237 | .237 | .237 | .237 | .237. |
| After 20 loads | .178 | .038 | ([4]) | .512 | .243. |
| Fatty Acid Removal in ml. oleic/g. mixture. Ml. oleic/g. CaO/SiO$_2$ | 0.40 2.70 | 0.50 1.67 | | 0.18 0.30 | 0.36. 2.40. |
| Solvent Color (Optical Density): | | | | | |
| Initial | .023 | .022 | .029 | .023 | .022. |
| After 20 loads | .448 | .422 | .432 | .403 | .400. |
| Detergent Removal in percent after 20 loads. | 12 | 14 | 19 | 13 | 10. |

[1] Sweetener of Patent No. 3,099,626 having a lime to silica ratio of 0.6 to 1.0.
[2] A high efficiency diatomaceous silica filter aid sold under the trademark "CELITE" 545.
[3] Diatomaceous silica filter aid of standard efficiency sold under the trademark "HYFLO."
[4] Zero after 5 loads.

Table 2 compares the performance of mixtures of high lime calcium silicate (lime to silica ratio 1.5) and diatomaceous silica filter aid with the sweetner of U.S. Patent No. 3,099,626. Under these particular conditions of testing, only 15% of the high lime calcium silicate was needed in the mixture to stabilize fatty acid content over a 20 load run. A mixture of 15% of the high lime sweetner and 85% of diatomaceous silica had an overall fatty acid removal capacity of 0.36 ml. per gram as compared to 0.18 ml. per gram for the product of U.S. Patent No. 3,099,626. Filter pressures and solvent color build-up are about equal for these mixtures, as is apparent, a fact of great significance when it is realized that only fifteen percent of the high lime material offers benefits approximately equal to sixty percent of the former low lime sweetener. Moreover, the new material removed somewhat less detergent.

Table 3 below illustrates the filter pressure and fatty acid removal characteristics of two preferred formulations according to the invention in comparison with the low lime sweetener of Patent No. 3,099,626 (Sample No. 0) containing 60% of 0.6 lime to silica ratio sweetener and 40% of high filter efficiency diatomaceous silica. There was also employed one percent of a standard drycleaners' detergent in all runs.

TABLE 3.—COMPARISON OF PREFERRED FORMULATION

| Sample | 2A | 2A | 0 |
|---|---|---|---|
| Composition | ([1]) | ([1]) | ([2]) |
| Filter Pressure after 15 loads in cm.Hg | 3.7 | 3.5 | 9.3 |
| Average free fatty acid removal over 15 loads, in ml. as oleic per gram of sweetener | 0.25 | 0.25 | 0.18 |

[1] 7½% 2A, 92½% DA$_2$.
[2] 60% O, 40% DA$_2$.

Figure 1:
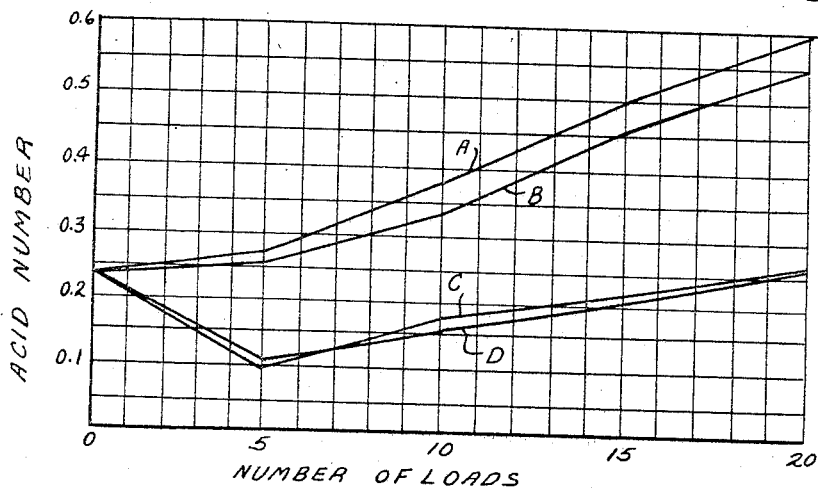
FIG. 1 is a graph showing a comparison of the relative fatty acids removal capacity of finely divided granules of calcium silicate employing varying lime to silica ratios.

Turning now to the drawings, FIGURE 1 is a plot of the number of drycleaning loads on the horizontal axis against the acid number (fatty acids content) on the vertcial axis and shows thereby the relative fatty acid removal capacity of various types of calcium silicate sweetener granules. In FIGURE 1, curve A is a plot of the fatty acid removal capacity of the low lime calcium silicate sweetener having a lime to silica ratio of about 0.5. Curve B is a plot of a relatively low lime calcium silicate having a lime to silica ratio of about 0.8. Curve C is a plot of the relative fatty acid removal capacity of an improved high lime calcium silicate according to the present invention having a lime to silica ratio of about 1.5, and curve D is similar to curve C, but having a lime to silica ratio of about 2.0.

Figure 2:
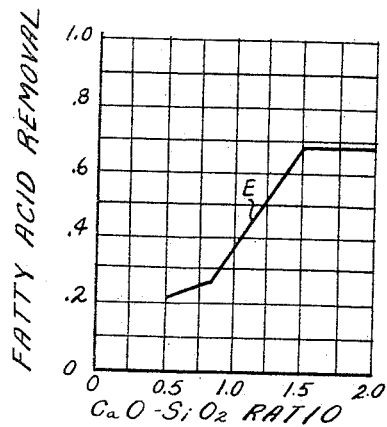
FIG. 2 is a graph showing the effect of the lime to silica ratio on the fatty acid removal characteristics of the calcium silicate samples plotted in FIG. 1.

FIGURE 2 is a plot taken from Table 1 above and illustrates the effect of the lime to silica ratio on the fatty acid removal capacity, curve E being plotted with the lime to silica ratio on the horizontal axis and the fatty acid removal rate on the vertical axis in milliliters of fatty acid per gram of sweetener. As is evident from both FIGURES 1 and 2, the fatty acid removal rate improves with increasing lime to silica ratio. The dip in the FIGURE 1 curves may be indicative of reaching an equilibrium point.

Figure 3:
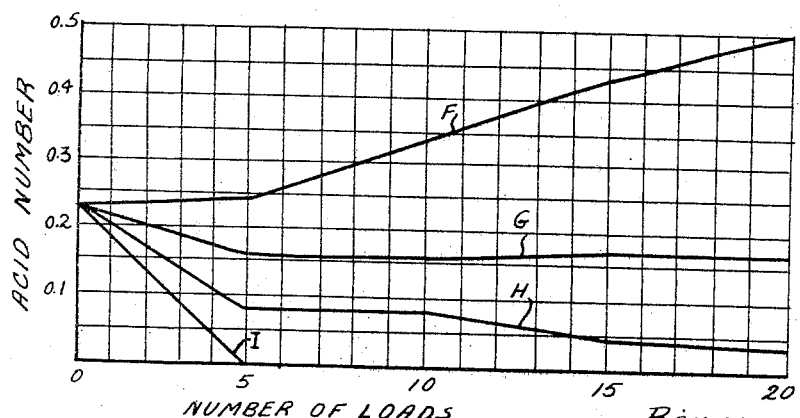
FIG. 3 is a graph showing a comparison of the relative fatty acid removal characteristics of various compositions according to this invention, compared with the sweetener composition of Patent No. 3,099,626.

FIGURE 3 is a plot similar to FIGURE 1 above and illustrates the fatty acid removal capacities of various high lime content sweetener compositions of the present invention in comparison to the low lime sweetener composition of Patent No. 3,099,626, the number of loads being plotted on the horizontal axis against the acid number or fatty acid content on the vertical axis. Curve F is a plot of the removal capacity of the low lime sweetener containing 60% of a 0.6 lime ratio calcium silicate and 40% of a high filter efficiency diatomaceous silica (DA$_2$, i.e., "Celite" 545). Curve G is a plot of a composition according to the present invention containing 15% of a high lime calcium silicate having a lime to silica ratio of about 1.5 in combination with 85% of the high efficiency diatomaceous silica filter aid. Curve H is a plot of a composition according to the present invention containing 30% of the high lime sweetener of curve G in admixture with 70% of the high efficiency diatomaceous silica filter aid. Curve I is similar to curves G and H employing 60% of the high lime sweetener in combination with 40% of the high efficiency diatomaceous silica filter aid. As is evident, the high lime compositions of the invention are vast improvements over the standard composition while increasing proportions of the high lime material yield increasing fatty acid removal capacities. The curve G compositon is preferred however, as it "controls" rather than "removes" all fatty acids.

Figure 4:
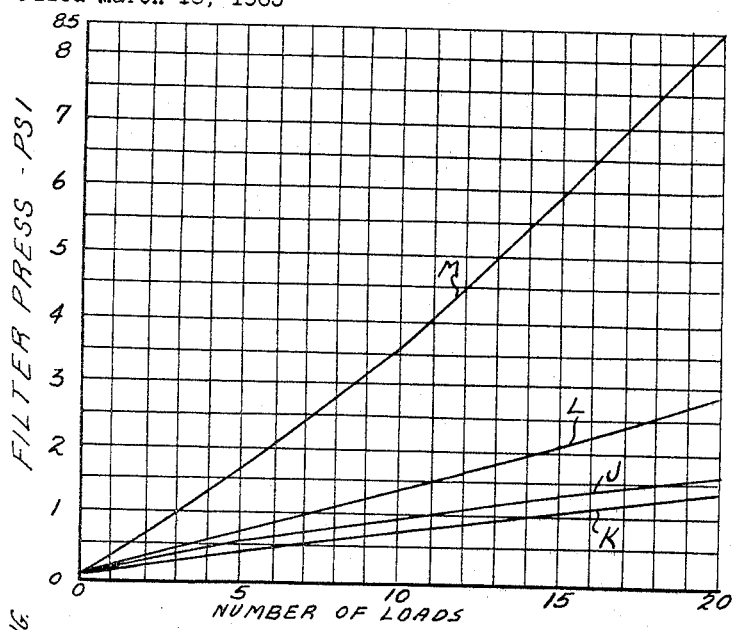
FIG. 4 is a graph showing a comparison of the filter pressure characteristics resulting from the use of various compositions according to this invention, compared with the sweetener composition of Patent No. 3,099,626.

FIGURE 4 is a plot showing the relative filter pressure characteristics of compositions according to the present invention with respect to the low lime composition of U.S. Patent No. 3,099,626, with the filter pressure in pounds per square inch being plotted on the vertical axis against the number of loads on the horizontal axis. Curve M is a plot similar to curve F of FIGURE 3 and shows the filter pressure characteristics of the composition of curve F, while curves J, K and L are plots respectively of the high lime compositions of curves G, H and I of FIGURE 3 to show their relative filter pressure characteristics. As will be recognized, only the filter pressure characteristics of the curve K 15% composition of the invention are better than those of the standard composition. The curve K composition is entirely satisfactory according to the invention, however, in view of the curve G shown in FIGURE 2.

FIGURE 5 is a plot showing the relative filter pressure characteristics of especially preferred compositions according to the present invention in comparison with an ordinary efficiency diatomaceous silica filter aid ($DA_1$ i.e., "Hyflo") and in comparison with the low lime composition of Patent No. 3,099,626. As with previous figures, the number of loads is plotted on the horizontal axis while the filter pressure is plotted on the vertical axis in centimeters of mercury. Curve N is a plot of the composition of curves F and M in FIGURES 3 and 4, while curve O is a plot of the standard efficiency diatomaceous silica filter aid ("Hyflo"). Curves P and Q are plots of especially preferred compositions of the present invention, curve P containing 15% of a high lime calcium silicate having a lime to silica ratio of about 1.5, in combination with 85% of a high efficiency diatomaceous silica filter aid ("Celite" 545). Curve Q is a plot of a composition according to the present invention containing 7½% of the same high lime calcium silicate in combination with 92½% of the same high efficiency diatomaceous silica filter aid. As is evident, the preferred curve P and Q compositions according to the invention offer vast improvement over the standard low lime composition of curve N, while the composition of curve P even exhibits better filter pressure characteristics than the standard efficiency filter aid.

Finally, FIGURE 6 is a plot similar to FIGURES 1 and 3 above illustrating the relative fatty acid removal capacity of the compositions plotted in FIGURE 5, the number of loads being indicated on the horizontal axis with the residual acid number being plotted on the vertical axis. Curve R is the low lime composition of Patent No. 3,099,626. Curve S is a plot of the standard efficiency diatomaceous silica filter aid ("Hyflo"). Curve T is a plot of the composition of curve P in FIGURE 5, while curve U is a plot of the composition of curve Q in FIGURE 5. Curve S will, of course, be recognized as a standard, and shows the fatty acid build-up that may be expected where no sweetener is employed. The standard low lime composition of curve R offers some improvement over this, but performs poorly in comparison to the preferred curve T and U compositions.

Example 4

A field test was run in a typical drycleaning establishment to evaluate the effect of the inventive composition. The establishment for this test is a perchlorethylene plant. The Hoffman washer took a 50 lb. load, and the Hoffman tubular filter was rated at 2000 gal./hr. The solvent in this plant was not kept in very good condition and titrations for determinations of fatty acid or detergent concentrations were never made.

The test program was started with the composition of curves P and T (7½% high lime sweetener). One-quarter pound of the composition was added to every other load (¼ lb./100 lb. clothes). This procedure was continued for a two-week period. Average daily filter pressure increase was 6 p.s.i. It was never necessary to blow down the filter during the day. Acid number was pretty much stabilized during the two-week period.

The low lime composition of curves N and R was tested for a one-week period using the same dosage as above. On two of the five days it was necessary to blow the filter down during the day. On two other days maximum filter pressure of 30 p.s.i. was reached. Again acid number was kept in equilibrium.

The 15% high lime composition of curves U and Q was also tested for a one-week period (6 days) at a ¼ lb. every-other-load basis. Average daily filter pressure increase was 4 p.s.i., and therefore, filter blow down during the day was not necessary. Acid number of the solvent definitely decreased as the week progressed, showing that this material was a more powerful sweetener than regular low lime composition.

Example 5

Another field test, similar to Example 4, was run in a small commercial perchlorethylene plant. The washer had a 15 lb. clothes capacity. The filter was a Sec pressure leaf type of about 600 gal./hr. capacity. This cleaner uses a 1% charge of Flo-Brite detergent, a non-ionic type which is not titratable. This plant always uses regular low lime composition, added to the loads, without difficulty.

For the test runs, one ounce of the low lime formulation was added to every load. This is at a rate of 6⅔ oz./100 lb. of clothes. The first week's run was made with the composition of curves P and T (7½% sweetener). Filter pressure rose from zero at the beginning of the week to 5 p.s.i. at the end of the week, a 5 p.s.i. differential. The regular low lime sweetener was run for the second week, and the filter pressure, starting at 5 p.s.i. from the previous week, increased to 15 p.s.i. for a 10 p.s.i. differential. For both of these runs fatty acid build-up was adequately controlled, and no distinguishable difference in performance in this respect was noted.

The composition of curves U and Q was then run for the following two weeks. Filter pressure started at 4 p.s.i. and reached 17 p.s.i. at the end of the two-week period. This is an incremental increase of 6½ p.s.i.-week. Fatty acid in the solvent dropped notably during this two-week period, again illustrating the higher sweetening capacity of the 15% formulation.

Example 6

For comparison purposes, another field test was run in a coin-operated drycleaning establishment. Eight-lb. capacity machines were tied to one filter. Normal cycle length between back-washings was 10 to 12 days. After this period of time, the filter was about full of filter cake and the pressure rose very rapidly. The standard practice was to drop the filter cake at the end of each day's work and reapply it and the manufacturer strongly recommends in its written instructions that the low lime sweetener of Patent No. 3,099,626 only be used as a purge just before back-washing. They state it should never be added at any other time because if it comes in contact with the filter screens, high pressures would result.

The first effort at this establishment was to evaluate the 15% composition of curves U and Q as a purge vs. the regular low lime composition (60% sweetener). Results showed the regular composition was relatively ineffective, removing only 6.3% of the fatty acid present. In contrast, the 15% sample removed 18.4% or 3 times as much.

Having won the operator's confidence, he was then persuaded to try adding the regular composition systematically to the loads. This was done daily over a two-month period without plugging the filter elements, proving the manufacturer wrong in this regard.

The first test run was made with the 7½% high lime composition, adding ½ lb. to every 8 loads (64 lb. clothes) on the filter. Maximum filter pressure was reached in the 8th day (1720 lb. of clothes cleaned). Fatty acid control was good.

Addition of the 15% high lime composition was reduced to ¼ lb. every 6 loads for the next run. This run lasted 11 days before maximum pressure was reached. Fatty acid control was adequate.

The third run was made using regular low lime composition at a rate of ¼ lb./6 loads. Maximum filter pressure developed in the 10th day and 10% fewer clothes were cleaned than in the previous run. Acid control was as good as with the 7½% composition.

The amount of the regular low lime composition was increased in the next run to ½ lb./8 loads, similar to the first run. In this case, maximum pressure developed after 6 days. This run illustrates what can happen with the regular low lime composition if usage instructions are not followed.

Finally, a fifth run was made using the 15% composition at ¼ lb. addition/6 loads. Surprisingly, this run lasted 12 days and caused no higher pressure than the 7½% composition. Also, surprisingly, the 15% material showed no improvement over the 7½% material in fatty acid removal.

In thus accomplishing its objectives, it is apparent that the present invention offers a greatly improved sweetener formulation for drycleaners' solvents having both improved fatty acid removal and control characteristics in comparison with the composition of Patent No. 3,099,626, while offering greatly improved filter pressure characteristics. For example, the low lime sweetener of such patent can be an effective and trouble-free product when used in conformity with manufacturer's instructions. The product of such patent, however, is subject to the disadvantage that the instructions have to be varied to suit the conditions of each particular cleaning establishment.

In contrast, it is now evident that the new high lime calcium silicate of this invention has approximately tripled the fatty acid removal characteristics offered by such low lime composition, while a blend according to the present invention and containing about 15% of the high lime calcium silicate will have double the fatty acid removal capacity offered by the low lime composition according to Patent No. 3,099,626, and containing 60% of the low lime calcium silicate. It therefore becomes possible, according to the present invention, to use considerably less calcium silicate and hence considerably more of filter aid in the formulation without the sacrifice of any fatty acid removal capacity. The result of higher filter aid loading is, of course, lower filter pressure. Further, as the material according to the present invention contains a greater proportion of filter aid, it offers the further advantage of being less expensive than the standard low lime compositions, due to the decreased calcium silicate requirements of the present invention compositions.

While a preferred reaction scheme has been identified for the preparation of the hydrated calcium silicate herein, it may be that other calcium silicate compositions, such as, for example, xonotlite and the hydrated calcium silicate composition described in United States Patent No. 2,966,441, will likewise suffice. It should be understood, therefore, that hydrated calcium silicates of different chemical compositions from that of the preferred high lime calcium silicate hydrate product, and/or those produced by other methods, for example, precipitated hydrated calcium silicate prepared by reacting solutions of calcium chloride and sodium silicate, but of equivalent quality, may be utilized in the practice of this invention.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What we claim is:

1. In a process for drycleaning soiled garments wherein an organic solvent medium is employed in a system to remove soil from the garments, the method of sweetening the fatty acid soil contaminated solvent medium of the system which comprises dispersing throughout the solvent medium a combination consisting essentially of approximately 5 to 15% by weight of a particulate hydrated calcium silicate produced by hydrothermal reaction of lime and silica and having a lime to silica ratio in the range of about 1.5 to 2.0:1, and about 85% to 95% by weight of a filter aid selected from the group consisting of diatomaceous silica, perlite, and mixtures thereof, and controlling and stabilizing the fatty acid content of the solvent medium by preferentially removing fatty acid from the medium with the particulate hydrated calcium silicate, and withdrawing the fatty acid soil from the system by filtering the same.

2. In a process for drycleaning soiled garments wherein an organic solvent medium is employed in a system to remove soil from the garments, the method of sweenening the fatty acid soil contaminated solvent medium of the system which comprises dispersing throughout the solvent medium approximately ¼ to 1 pound per 100 pounds of soiled garments cleaned, of a combination consisting essentially of about 5 to 15% by weight of particulate hydrated calcium silicate produced by hydrothermal reaction of lime and silica and having a lime to silica ratio in the range of about 1.5 to 2.0:1, with about 95 to 85% by weight respectively, of filter aid selected from the group consisting of diatomaceous silica, perlite, and mixtures thereof, and controlling and stabilizing the fatty acid content of the solvent medium by preferentially removing fatty acid from the medium with the particulate hydrated calcium silicate, and withdrawing the reacted fatty acid soil from the system by filtering the same.

3. In a process for drycleaning soiled garments wherein an organic solvent medium is employed in a system to remove soil from the garments, the method of sweetening the fatty acid soil contaminated solvent medium of the system which comprises admixing with the solvent medium a combination consisting essentially of about 5 to 15% by weight of particulate hydrated calcium silicate produced by hydrothermal reaction of lime and siliceous material in a ratio of about 1.5 to 2.0:1, with a filter aid selected from the group consisting of diatomaceous silica, perlite, and mixtures thereof in amount of approximately 95 to 85% by weight, said combination being admixed with the solvent medium in proportions of approximately 1 pound per 100 gallons of solvent, and controlling and stabilizing the fatty acid content of the solvent medium by preferentially removing fatty acid from the medium by the reaction with the particulate hydrothermally produced hydrated calcium silicate, and withdrawing the reacted fatty acid soil from the system by filtering the same.

4. In a process for drycleaning soiled garments wherein an organic solvent medium is employed in a system to remove soil from the garments, the method of sweetening the fatty acid soil contaminated solvent medium of the system which comprises admixing with the solvent medium a combination consisting essentially of about 7½% by weight of particulate hydrated calcium silicate produced by hydrothermal reaction of lime and siliceous material in a ratio of about 1.5 to 2.0:1, and about 92½% by weight of filter aid selected from the group consisting of diatomaceous silica, perlite, and mixtures thereof, said combination being added in amount of approximately ¼ to 1 pound per 1000 gallons of solvent, and controlling and stabilizing the fatty acid content of the solvent medium by preferentially removing fatty acid from the medium by the reaction with the particulate hydrothermally produced hydrated calcium silicate, and withdrawing the reacted fatty acid soil from the system by filtering the same.

5. A dry cleaning solvent sweetener consisting essentially of about 5 to 15% by weight of particulate hydrated calcium silicate prepared by hydrothermal reaction of lime and silica and having a lime to silica ratio in the range of about 1.5 to 2.0:1 and about 95 to 85% by weight of a filter aid selected from the group consisting of diatomaceous silica, perlite and mixtures thereof, said sweetener exhibiting a preferential removal for fatty acid.

6. A drycleaning solvent sweetener is defined in claim 5 wherein the said particulate hydrated silicate is contained in about 15% by weight and the said filter aid is about 85% by weight.

7. A drycleaning solvent sweetener as defined in claim 5 wherein the said particulate hydrated silicate is present in about 7½% by weight and the said filter aid is about 92½% by weight.

8. In a process for drycleaning soiled garments wherein an organic solvent medium is employed to remove soil from the garments, the method of sweetening the fatty acid soil contaminated solvent medium which comprises admixing with the solvent medium a combination consisting essentially of about 5 to 15% by weight of particulate hydrated calcium silicate produced by hydrothermal reaction of lime and silica in a mol ratio of about 1.5 to 2.0:1 and about 95 to 85% by weight of a filter aid, controlling and stabilizing the fatty acid content of the solvent medium by preferentially removing fatty acid from the medium with the particulate hydrated calcium silicate, and withdrawing the fatty acid soil from the system by filtering the same.

9. A process according to claim 8, in which said organic solvent medium includes a detergent.

References Cited

UNITED STATES PATENTS

| | | | |
|---|---|---|---|
| 2,966,441 | 12/1960 | Vander Linden et al. | 23—110 |
| 3,099,626 | 7/1963 | Riede | 252—163 |

LEON D. ROSDOL, *Primary Examiner.*

W. SCHULZ, *Assistant Examiner.*

U.S. Cl. X.R.

23—110; 134—13; 252—184